Aug. 17, 1943.　　　K. W. HALLDEN　　　2,327,106
FLYING CUTTING DEVICE
Filed Sept. 12, 1942　　　5 Sheets-Sheet 1

Fig. 1.

Inventor
Karl W. Hallden
by Seymour Earle &
Nichols
Attorneys

Aug. 17, 1943.      K. W. HALLDEN      2,327,106
FLYING CUTTING DEVICE
Filed Sept. 12, 1942      5 Sheets-Sheet 2

Inventor
Karl W. Hallden
by Seymour Earle & Nichols
Attorneys

Aug. 17, 1943.   K. W. HALLDEN   2,327,106
FLYING CUTTING DEVICE
Filed Sept. 12, 1942   5 Sheets-Sheet 3

Inventor
Karl W. Hallden
By Seymour Earle & Nichols
Attorneys

Patented Aug. 17, 1943

2,327,106

UNITED STATES PATENT OFFICE 2,327,106

FLYING CUTTING DEVICE

Karl W. Hallden, Thomaston, Conn.

Application September 12, 1942, Serial No. 458,073

6 Claims. (Cl. 164—49)

This invention relates to improvements in flying cutting devices in which stock, for example, sheet metal, is continuously fed by feed-means to cutter-means which cuts the stock into lengths without stopping the feed of the stock.

One object of this invention is to provide an improved flying cutting device having improved adjustable means for accomplishing different lengths of cut.

With the above and other objects in view, as will appear to those skilled in the art from the present disclosure, this invention includes all features in the said disclosure which are novel over the prior art.

In the description and claims, the various parts and steps are identified by specific names for convenience, but they are intended to be as generic in their application as the prior art will permit.

In the accompanying drawings, in which certain ways of carrying out the invention are shown for illustrative purposes.

Referring to Figs. 1 to 4 inclusive of the drawings, which illustrate one form of the invention, the flying cutting device illustrated, includes a cutter-unit or -means 10 which in the particular form illustrated is a form of flying-shear known as a "guillotine" flying-shear, and feed-means in the form of feed-rolls 11. The cutting-means 10 and feed-means 11 are driven by drive-means in the form of an electric motor 12 through mechanism interconnecting the cutting-means 10 and feed-means 11 in the form of a pair of feed-rolls of which only the upper one is shown. The interconnecting mechanism includes an infinitesimally-adjustable speed-ratio unit 13, a differential-gear unit 14, a change-gear or step-gear unit 15, and a miscut-unit 16. The miscut-unit 16 performs additional functions beside accomplishing miscutting, but the term miscut is used for convenience and simplicity.

The details and modes of action of the units 13, 14 and 15 are more fully described in my previously - granted Patents Nos. 2,144,307; 2,144,308 and 2,201,581, and will therefore only be described in sufficient detail in the present application to facilitate an understanding of the present invention.

Figure 1:
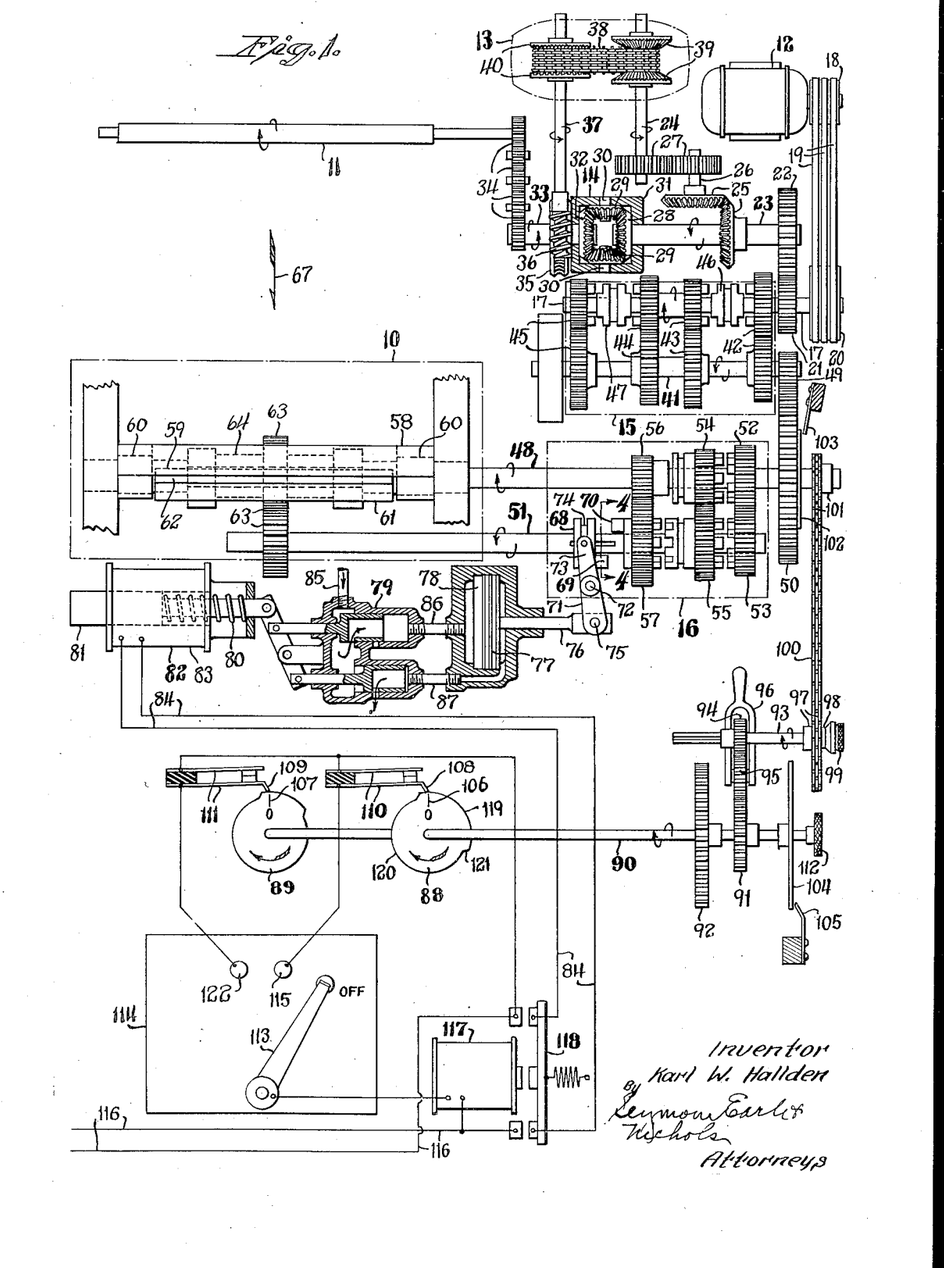
Fig. 1 is a schematic plan view illustrating one way of carrying out the invention.

The shaft 17 driven from the drive-motor 12 through pulley 18, belt 19 and pulley 20, has secured thereto a pinion 21 in driving relation with a gear 22 secured to a shaft 23. Shaft 23 drives the input-shaft 24 of the infinitesimally-adjustable speed-ratio unit 13 through the pair of bevel gears 25, shaft 26, and a pair of spur gears 27. The left end of shaft 23 has a bevel gear 28 secured thereto which meshes with two bevel sun-gears 29 pivoted at 30 to the differential housing 31, the gears 29 also meshing with a bevel gear 32 secured to a differential output-shaft 33 which, through suitable gearing 34, drives one of the feed-rolls 11, the two feed-rolls being geared together to rotate at equal speeds in opposite directions in a usual manner. The differential-gear unit 14 comprises the differential gears 28, 29 and 32 and the differential housing 31.

A worm gear 35 is secured to the differential housing 31 and meshes with a worm 36 secured to the output-shaft 37 of the infinitesimally-adjustable speed-ratio unit 13. The unit 13 has a special sprocket chain 38 in driving relation between two pairs of conical sprocket wheels 39 and 40, the wheels of each pair of sprocket wheels being adjustable toward and from one another by suitable means (not shown), the particular unit 13 shown being a commercial device known as the "P. I. V." made by the Link-Belt Company of Philadelphia, Pennsylvania. Most of the power transmitted from the shaft 17 to the feed-rolls 11 is transmitted through the differential-unit 14, only a minor portion of the power passing through the unit 13, which unit 13 can be set to give, through the worm 36 and worm gear 35, any desired speed of rotation to the differential housing 31 within the range provided by the infinitesimal adjustability of the unit 13, to thus act as a control or governor for the differential-unit 14 to give any desired speed to the feed-rolls 11.

The shaft 17 is also adapted to drive a shaft 41 through any pair of the four pairs of selectively-engageable change-gears or step-gears 42, 43, 44 and 45, by suitable actuation of one or the other of the splined clutch-members 46 or 47 to connect one of the gears 42, 43, 44, 45 on the shaft 47 which are freely rotatable thereon, with one of the gears 42, 43, 44, 45 on the shaft 41 which are keyed thereon, in a way that is well known. The shaft 41 drives the main cutter drive-shaft 48 by means of the gears 49 and 50. And the main cutter drive-shaft 48 drives the complemental cutter drive-shaft 51 through any pair of the pairs of gears 52, 53; 54, 55; and 56, 57 in a way that will be more fully explained hereinafter.

Figure 2:
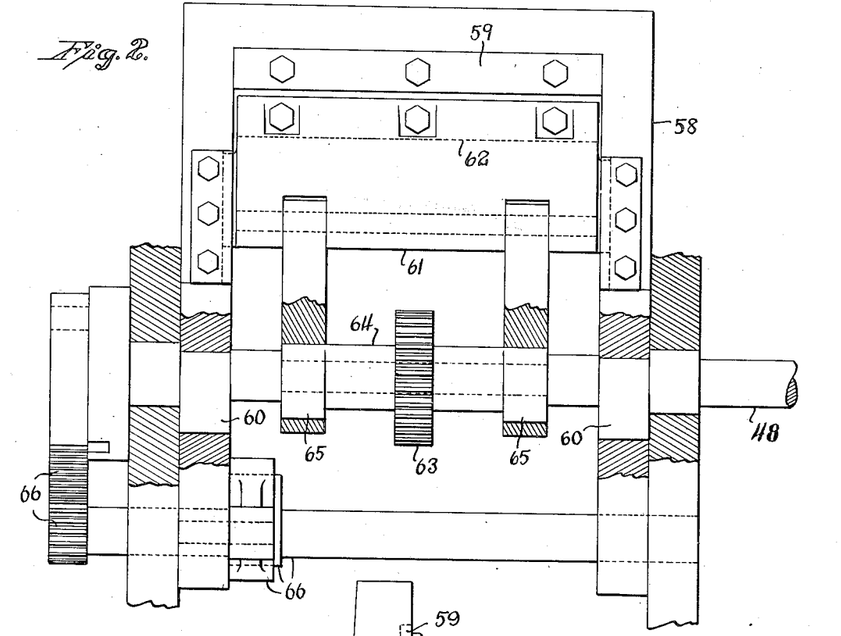
Fig. 2 is a fragmental front elevation partly in section of one form of cutter-means which is employed in connection with illustrating the present invention.
Figure 3:
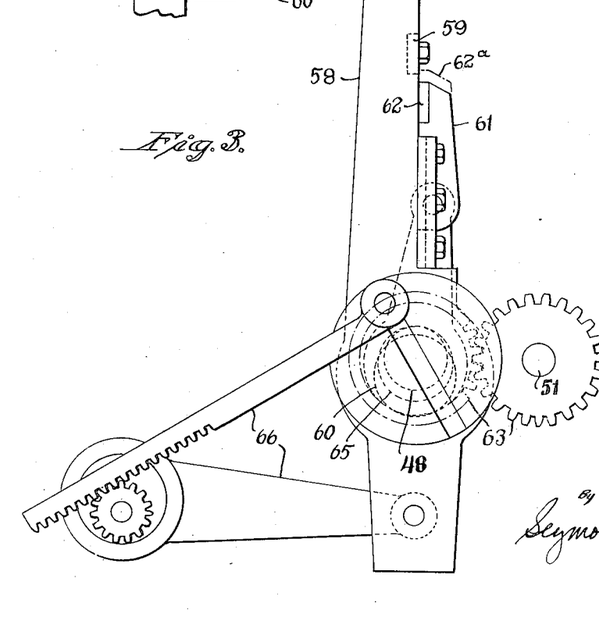
Fig. 3 is a left side elevation of Fig. 2 with the bearing portions of the machine omitted.
Figure 4:
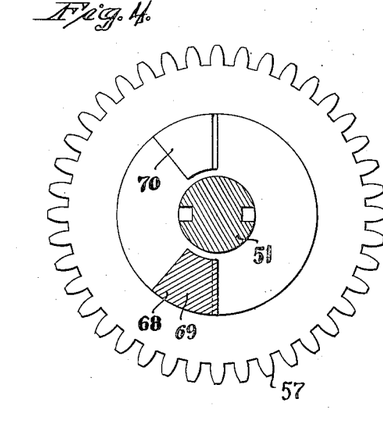
Fig. 4 is a sectional view on line 4—4 of Fig. 1.

The main cutter drive-shaft 48 drives the shear-frame 58 and the upper cutter 59 secured thereto, by means of the eccentrics 60, and the drive-shaft 51 drives the gate 61 and the lower cutter 62 secured thereto, in sliding relation to the shear-frame 58, by means of the pair of gears 63, and sleeve 64 having eccentrics 65, all in a manner more fully set forth in my Patent No. 2,144,308, granted January 17, 1939. The synchronizing mechanism 66 will not be described herein as a description of it is not necessary to an understanding of the present invention, but this synchronizing mechanism is also fully explained in my said Patent No. 2,144,308.

The pairs of change-gears or step-gears 42, 43, 44 and 45 provide means whereby the speed of rotation of the cutter-shaft 48 can be varied in steps to thus correspondingly vary the length of cut being made from the stock fed therethrough by the feed-rolls 11; and the infinitesimally-adjustable speed-ratio unit 13 in conjunction with the differential-gear unit 14 provides infinitesimally-adjustable means whereby the feed-rolls 11 can have their speed varied by infinitesimal gradations covering the gaps between the pairs of step-gears 42, 43, 44 and 45. Thus, the step-by-step adjustment of the cutter-means 10 and the infinitesimal adjustment of the feed-means 11, together provide for complete infinitesimal adjustment of the speed-ratios between the cutter-means 10 and the feed-means 11 over the whole range of the step-gears. The electric motor 12 is preferably one whose speed can be readily adjusted so that, when the speed of feed of the feed-rolls 11 is lowered by an adjustment of unit 13 below a desired speed of output of cut stock, the speed of the motor 12 can be adjusted to a higher speed so as to hold the speed of output substantially constant at all times, if so desired.

In the miscut-unit 16, the gears 52 and 56 are keyed to the shaft 48 and the clutch-gear 54 is freely rotatable and slidable on the shaft 48 so as to be shiftable into and out of clutching engagement with the gear 52. The gears 53 and 57 are freely rotatable on the shaft 51 and the clutch-gear 54 is splined to the shaft 51 so as to be shiftable into and out of clutching engagement with either of gears 53 or 57. When stock is to be cut into lengths anywhere in the range from the shortest length possible up to the longest length that can be cut when the complemental cutters 59 and 62 cut at each revolution of the shaft 48, the gears 52 and 53 form the drive between the shafts 48 and 51, this being accomplished by having the clutch-gear 55 slid to the right to bring its clutch-teeth in clutching engagement with the clutch-teeth of the gear 53, the gears 52 and 53 having a one-to-one speed ratio and the two gears 63 also having a one-to-one speed ratio. When a length of cut is required which is beyond the capacity of the machine when the gears 52 and 53 form the drive for the shaft 51, then the pair of gears 56 and 57 which have a speed ratio of two-to-one, are brought into action by shifting the clutch-gear 55 to the left to bring its clutch-teeth into engagement with the clutch-teeth of the gear 57, with the result that the lower cutter 62 will only be brought up into cutting position with the upper cutter 59 at every other revolution or rotation of the shaft 48, that is, at every other time that the upper cutter 59 moves into cutting position, with the result that what is known as a miscut is accomplished. In other words, as the stock is traveling through the cutter-means 10 from the feed-rolls 11 in the direction of the arrow 67, the stock will be cut at one time of rotation of the shaft 48 when the upper cutter 59 arrives down at its cutting position shown in Fig. 3 and when the lower cutter 62 also arrives at its cutting position shown at 62a in broken lines in Fig. 3, and on the next rotation of the shaft 48 when the upper cutter 59 arrives down at its cutting position, the lower cutter 62 will have arrived only at its lower or most distant position from the cutter 59 so that there is no cutting action at this time, the stock merely continuing to be fed through the machine until another rotation of the shaft 48 has taken place, whereupon, when the upper knife 59 again arrives down in its cutting position, the lower knife 62 also arrives up in its cutting position to cut the stock, and this mode of action continues as long as the gears 56 and 57 constitute the drive between the shafts 48 and 51.

When a length of cut is required which is still longer than can be obtained with the gears 56 and 57 forming the drive between shafts 48 and 51, then the clutch-gear 55 is slid out to its neutral position shown in Fig. 1, and the clutch-gear 54 is slid to the right to clutch it to the gear 52 which thereupon causes the gears 54 and 55 to form the drive between the shafts 48 and 51, and inasmuch as these gears have a speed ratio of three-to-two, after each cut by the cutters 59 and 62 there are two miscuts while the stock continues to be fed, after which the cutters 59 and 62 again cut stock, and so on. Miscutting is more fully explained in my previously referred to Patent No. 2,144,308.

When a still longer length of cut than can be accomplished by the miscut gears 54 and 55, is required, this can be accomplished by what will be hereinafter called a "no-cut." While the no-cut arrangement and the miscut arrangement could all be included under the term "miscut," it is considered that the understanding of the invention will be clearer if the term "miscut" is limited to referring to where both cutters are traveling, but at such different speeds that periodically only one of the cutters arrives in cutting position, the other cutter having a speed of travel such that at that particular time it is somewhere other than at proper cutting position, so as to produce what is called a "miscut," whereas the term "no-cut" as will presently be better understood, will be used to refer to that result which occurs when one of the cutters continuously travels and periodically arrives at the proper cutting position, but the other cutter has been disengaged from driving relation so that it is not being driven at the time that the other cutter arrives at the position of cut, so that the undriven cutter is simply quiescent and out of cutting position so that this is called for convenience and simplicity a "no-cut" in order to distinguish it from miscut.

In order to accomplish no-cutting, the gear 57 of the unit 16 is unclutched from the clutch gear 55 and freely rotatable on the shaft 51 in the position of the parts shown in Fig. 1, so that the shaft 51 is not being driven from the shaft 48. In order to accomplish the no-cutting, a certain automatic mechanism which will be hereinafter described, forms a part of the means for periodically shifting a single lug dog-clutch 68 which is splined to the shaft 51, to bring its single clutch-lug 69 into position to engage the single clutch-lug 70 of the gear 57 which thus causes the gear 56 to drive the shaft 51 through the gear 57 as long as the dogs 69 and 70 are in clutched position. When the clutch 68 is again slid to the left to its position shown in Fig. 1, the clutch-lugs 69 and 70 will be disengaged whereupon the shaft 51 ceases to rotate and the gate 61 and its cutter 62 come to rest in their lowermost position as shown in solid lines in Figs. 2 and 3, and this condition may continue for any desired number of revolutions of the shaft 48 with the result that at each revolution of the shaft 48 while the shaft 51 is not rotating, there will be a no-cut. Thus, it will be seen that by providing suitable means to automatically hold the dog-clutch 68 out of clutching position a properly timed length of time, any desired number of no-cuts can be accomplished, and, of course, every time that a no-cut occurs, inasmuch as the stock is continuously being fed, that means that when a cut is again made by the dog-clutch 68 being again shifted to the right into clutching position to bring about a cut, the length of the piece of stock cut will depend on the number of no-cuts.

The no-cut action is accomplished by means of a lever 71 pivoted at 72 at any suitable location on the machine and having its forked end 73 engaging in the annular slot 74 of the clutch 68 so that when the other end pivoted at 75 to the rod 76 is actuated to the left by the rod 76, the clutch 68 will be moved to clutching position, and when the rod 76 is moved to the right to the position shown in Fig. 1, the clutch 68 will be moved to unclutched position.

The automatic mechanism for shifting the clutch 68 can be of any suitable type. The particular type schematically illustrated includes a piston 77 secured to one end of the rod 76 and mounted to be slidable back and forth in a cylinder 78 adapted to have fluid such, for example, as air under pressure brought to one side or the other of the piston by suitably controlled mechanism, to clutch or unclutch the clutch 68 as desired, by any suitable form of valve-mechanism 79. In the particular construction illustrated, a spring 80 holds the magnetic core 81 of the solenoid 82 pushed to the left in the position illustrated when no current is flowing through the coil 83 of the solenoid from the wires 84. With the parts of the valve-mechanism 79 in the positions in which they are held by the spring 80 as shown, air under pressure enters the inlet-pipe 85 and passes through the pipe 86 into the left end of the cylinder 78 to force the piston 77 to the right end of the cylinder as shown, while at the same time permitting exhaust air to pass out of the pipe 87 from the right end of the cylinder. When electric current is sent through the coil 83 of the solenoid 82 by means of the wires 84, as will be more fully hereinafter explained, the magnetic core 81 is drawn to the right inside of the coil 83 against the action of the spring 80 to cause air pressure to pass from inlet pipe 85 through the pipe 87 to behind the right end of the piston 77 and to exhaust air from the left side of the piston through pipe 86, thus moving the piston 77 to the left, and moving clutch 68 to the right to clutched position to engage the dogs 69 and 70. It will thus be seen that the clutch 68 is at all times held in one or the other of its unclutched and clutched positions under air pressure in the cylinder 78.

The electric-switch mechanism for controlling the times of actuation of the clutch 68 to clutched and unclutched positions, will now be described. Two switch-cams 88 and 89 are rigidly mounted on a switch-cam shaft 90 which is selectively drivable through one of the other of the gears 91 and 92 rigidly secured on the shaft 90, from a shifter-gear shaft 93 having a shifter-gear 94 splined thereto for longitudinal sliding movement, the shifter-gear 94 selectively driving one or the other of the gears 91, 92 through the shifter-gear 95 which is pivotally carried by a shifter-arm 96 well known to those skilled in the mechanical arts, which is pivoted for swinging movement about the axis of the shaft 93, so that by proper swinging movement of the shifter-arm 96 to take the shifter-gear 95 out from engagement with the gear 91 or 92 with which it is engaged, to slide the group of parts 94, 95 and 96 along the shaft 93 and then swing the shifter-arm 96 to bring the shifter-gear 95 into engagement with the other of the gears 91 and 92, in a way that is well understood to those skilled in the art, it will be understood that one or the other of the gears 91, 92 can be brought into driving engagement with the gear 94 on the shaft 93.

The shaft 93 has a sprocket or sprocket-wheel 97 having its hub 98 rotatably mounted on the shaft 93 and clutchable to or unclutchable from driving relation with the shaft 93 by means of a cone friction-clutch member 99 screw-threadedly mounted on one end of the shaft 93 so as to be engageable with a corresponding internal cone-face on the hub 98 of the sprocket 97. The sprocket 97 is driven through a chain 100 from a sprocket 101 rigidly mounted on the shaft 48. A disk 102 rigidly secured to the gear 59 has a mark (not shown) thereon to register with the pointer 103 to indicate when the upper cutter 59 is down in cutting position.

A disk 104 is rigidly secured on the switch-cam shaft 90 and has a mark (not shown) which registers with the pointer 105 when the shaft 90 is in such position that the marks 106 and 107 of the cams 88 and 89 are respectively immediately directly beneath the contacting arms or portions 108 and 109 respectively of the limit-switches 110 and 111. With the machine having been actuated to bring the upper cutter 59 down to cutting position as shown in Figs. 2 and 3, in a well known to those skilled in the art, and therefore with the mark (not shown) on the disk 102 in registration with the pointer 103, the cone-clutch member 99 is unscrewed to unclutched position, and the shaft 90 is rotated by the hand-knob 112 thereon to bring the mark (not shown) on the disk 104 in registration with the pointer 105 to thus bring the mark 106 directly beneath or in registration with the part 108 of the switch 110, as shown in Fig. 1, whereupon the cone-clutch member 99 is moved to clutched position again. With the parts as illustrated in Fig. 1, the switch-cam shaft 90 will rotate at one-fourth the speed of the shaft 48 and at one-half the speed of the shaft 51, since the speed ratio of the sprockets 101 and 97 is two-to-one, and the speed ratio of the gears 94 and 91 is also two-to-one. In the construction as illustrated in Figs. 1 to 4, the clutch-engaging face of the clutch-dog 70 is vertically upward in the position shown in Figs. 1 and 4 when the upper cutter 59 is down in proper cutting position, and since the gear 57 rotates at one-half the speed of the gear 56, the cutter 59 will be in proper cutting position also when the engaging-face of the clutch-dog 70 is in its lowermost position or one-half revolution from that shown in Figs. 1 and 4.

It will now be assumed that the parts are in the positions described and illustrated in Fig. 1. If now the switch-arm 113 of the selector-switch 114 is moved from its off position as shown, into engagement with the contact 115, the electric circuit will be closed from the power wires 116, through the limit-switch 119, through the relay 117 which closes the switch 118 to thus close the circuit through the wires 84 and the coil 83 of the solenoid 82 to thus cause the piston 77 to shift the clutch 68 from its unclutched position shown in Fig. 1, to its clutched position.

If the electric power is now supplied to the electric motor 12 to start the machine in operation, before the clutch-dog 70 has rotated enough to engage the clutch-dog 69, the cam 88 will have rotated far enough to cause the switch contact-arm 108 to spring down off the cam high-portion 119 onto the cam low-portion 120 and thus open the switch 110 and break the circuit to the solenoid 82, thus permitting the spring 80 to cause the piston 77 to shift the clutch 68 to unclutched position. This particular clutching and unclutching movement of the clutch 68 is of no significance in the operation of the machine, but since it occurs, it has been described to avoid possible misunderstanding.

As the machine continues its operation, the lug 70 of the gear 57 will finally complete one rotation and arrive back in the position where it is shown in Fig. 1, but inasmuch as the lug 70 did not engage the clutch-lug 69, the lower cutter will not have been raised to cutting position and therefore a no-cut will occur at this position when the lug 70 has arrived back at its top position shown in Fig. 1. But in the meantime, since the cam-shaft 90 rotates at half the speed of the shaft 51 and gear 57, sometime before the lug 70 has rotated far enough to engage the lug 69, the cam-portion 121 will have engaged the switch-arm 108 to raise it onto the high-portion 119 of the cam 88 to close the switch 110 and thus cause the clutch and its lug 69 to be moved into clutching position, so that the lug 70 will engage the lug 69 and cause the gate 61 and the lower cutter 62 to be raised into cutting position when the lug 70 again reaches its upper position shown in Fig. 1, to thus cut stock, since the upper cutter 59 will also have arrived down at its cutting position at the time that the cutter 62 arrived up at its cutting position, this cutting action occurring when the indicator marked 106 of the cam 88 has again arrived back at its position shown in Fig. 1. Now, as the machine continues to operate, the switch-arm 108 passes down from the high-portion 119 to the low-portion 120 of the cam 88, thus breaking the circuit through the switch 110 and causing the clutch 68 and its lug 69 to move to unclutched position. Regardless of the position of the lug 69 at the time of unclutching, the weight of the gate 61 and its associated parts, by moving to their lowermost position, will cause the lug 69 to move to the position shown in Fig. 1. And when the shaft 48 has rotated one complete revolution to again bring the upper cutter 59 down to cutting position, the gear 57 will have only moved half a revolution and the cam 88 will have moved only one-quarter a revolution, so that since the lower cutter will not be brought to cutting position with the cutter 59, a no-cut will occur at this time, and when the shaft 48 makes another rotation to again bring the cutter 59 down to its cutting position, the cam 88 will have completed only half a revolution from the position shown in Fig. 1, so that again a no-cut will occur at the time the lug 70 has arrived back at its topmost position shown in Fig. 1, and when the shaft 48 has made still another revolution to again bring its cutter 59 down into cutting position, the cam 88 will have closed the circuit through the switch 110 to shift the clutch 68 and its lug 69 to clutching position in time to be engaged by the lug 70 when it reaches the bottom of its rotation, but inasmuch as the upper cutter 59 has reached its cutting position at the time that the lug 70 reached its bottom position, and before the lugs 70 and 69 have had time to lift the lower cutter 62 to cutting position, a third no-cut will occur at this time. But now as the lug 70 moves from its lower position to its upper position shown in Fig. 1 while in clutching engagement with the lug 69, the gate 61 and lower cutter 62 will be raised to arrive at cutting position at the same time that the upper cutter 59 arrives down at cutting position at its next rotation. Thus, it will be seen that by employment of the gear 91 and cam 88 and associated parts, the cutters 59 and 62 make three successive no-cuts for each cut that is made by them, thus accomplishing a longer length of cut than could be accomplished by utilizing the miscut gears of the unit 16. This cycle of operations of one cut to three no-cuts is repeated as long as the described mechanism is permitted to continue to operate. If instead of leaving the switch-arm 113 on the contact 115, it be engaged with the contact 122, if the shifter-gear mechanism 94, 95, and 96 be shifted to bring the gears 94 and 95 into driving relation with the gear 92 which is twice the diameter of the gear 91, then instead of there being three no-cuts between each two cuts, there will be seven no-cuts between each two cuts, since the shaft 90 is now driven at one-eighth of the speed of the shaft 48.

With all of the parts of the machine in the positions illustrated in Fig. 1, assume the clutch-gear 55 to be shifted to the right to cause the gears 52 and 53 to bring the shafts 48 and 51 into a one-to-one speed ratio driving engagement with one another. Assume that with the forms of the invention illustrated in the drawings, it is desired to cut any desired length from thirty up to four hundred and twenty inches (thirty-five feet), and assume that in the form of machine illustrated in Fig. 1, with the gears 52 and 53 acting as driving-means between the shafts 48 and 51, and by making all of the possible adjustments of the step-gear unit 15 and of the infinitesimally-adjustable speed-ratio unit 13, that any length of cut desired can be obtained from thirty inches to sixty inches, the cut being accomplished at each rotation or revolution of the shafts 48 and 51. If now it is desired to cut a longer length than sixty inches but not over one hundred and twenty inches, this can be accomplished by shifting the clutch-gear 55 to the left into engagement with gear 57 to cause the gears 56 and 57 to constitute the drive between the shafts 48 and 51 at a speed ratio of two-to-one instead of the one-to-one ratio just previously described, and by making all the possible adjustments for length of cut of the units 13 and 15, and with the shaft 51 and the lower cutter 62 moving at half the speed of the shaft 48 and the upper cutter 59, a miscut will occur at each alternate revolution of the shaft 48 inasmuch as the lower cutter 62 will only arrive in cutting position at each alternate time that the upper cutter 59 arrives at cutting position. Therefore since the stock continues to be fed through the machine while the miscut occurs, double lengths of cut can now be accomplished from sixty to one hundred and twenty inches. If now it be desired to cut a longer length, the clutch-gear 55 is moved to its intermediate position as shown in Fig. 1, and the clutch-gear 54 is shifted to the right into clutching engagement with the gear 52 so that the gears 54 and 55 constitute the drive between the shafts 48 and 51, and since the speed ratio of the shafts 48 and 51 will now be three-to-two, the cutters 59 and 62 will both arrive in cutting position only once in every three revolutions so that two miscuts will occur to every cut, and thus it will be seen that it is now possible by this in conjunction with the adjustments of the units 13 and 15 to cut triple lengths from ninety to one hundred and eighty inches. If now it be desired to cut still longer lengths, the clutch-gear 54 is shifted to its neutral position, so that both clutch-gears 54 and 55 are in the neutral positions illustrated in Fig. 1, and the selector switch-arm 113 is moved onto contact 115 of the selector-switch 114, so that with the gears 94 and 91 constituting the drive between the shafts 93 and 90, the clutch 68 is moved to bring the dogs 69 and 70 into clutching operation to cause a cut, and then the clutch 68 is kept out of clutching position by the cam 88 and switch 110 and associated parts for three following times that the upper cutter arrives in cutting position, during which time the cutter 62 remains quiescent at its bottommost position to cause three no-cuts, and then the cam 88 again closes switch 110 to again move the clutch into clutching position to bring about the next cut. Thus, it will be seen that by means of the cam 88 and the parts as just described, three no-cuts will be accomplished to each cut made by the machine, thus making it possible to cut quadruple lengths from one hundred and twenty to two hundred and forty inches.

By now bringing the gears 94 and 92 into driving relation between the shafts 93 and 90 and moving the switch-arm 113 to the contact 122, the cam 90 and switch 111 and associated parts will cause seven no-cuts for each cut. And thus, since we can adjust the cutting length of the machine anywhere from thirty to sixty inches by adjustment of the units 13 and 15 alone, by means of the no-cut arrangement just described in connection with the cam 89, it is possible to cut octuple lengths of from two hundred and forty to four hundred and eighty inches. Thus, it will be seen that with the construction described, it is possible to cut any length whatever from a length of thirty inches up to a length of four hundred and eighty inches which is more than the assumed needed maximum of four hundred and twenty inches. And, of course, by providing additional cams and associated parts, still longer lengths of cut can be accomplished.

Figure 5:
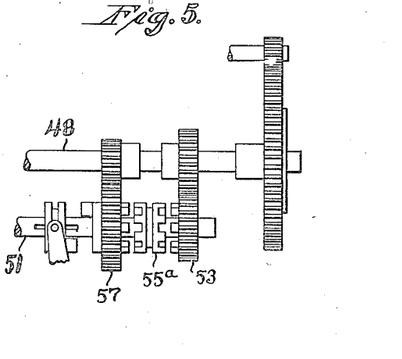
Fig. 5 is a fragmental plan view of a modified form of the invention.

Since any length of cut from thirty to sixty inches can be accomplished solely by adjustment of the units 13 and 15, and since the no-cutting apparatus when employing the cam 88 and associated parts causes three no-cuts to each cut, any length of cut from one hundred and twenty inches to two hundred and forty inches can be accomplished by the no-cutting apparatus when employing the cam 88, and therefore it is not necessary to use gears 54 and 55 to accomplish the two miscuts to every cut, it being possible to completely eliminate these gears. Such a construction has been illustrated in Fig. 5 wherein the gear 54 has been omitted and in place of the gear 55 is shown a clutch 55a selectively shiftable into engagement with either of gears 53 and 57.

Figure 6:
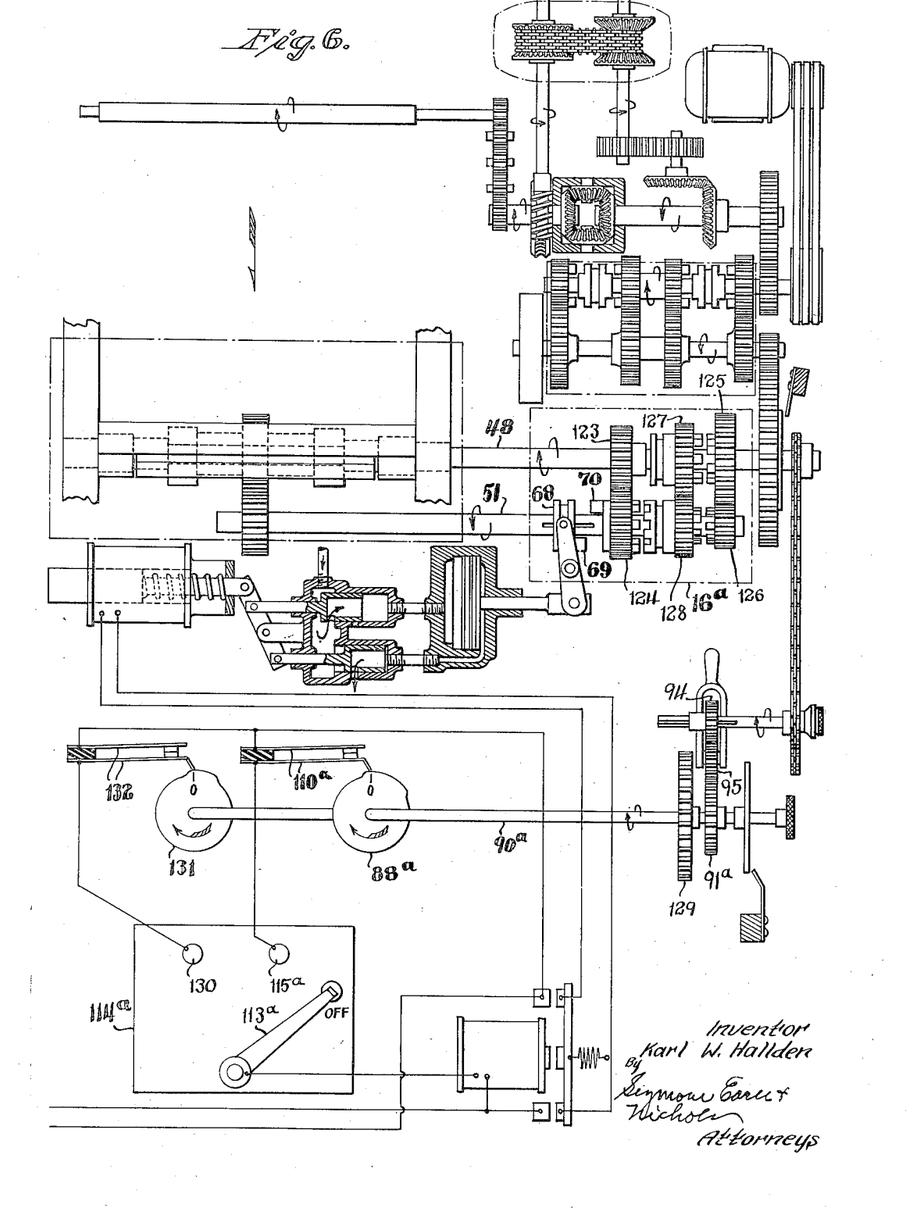
Fig. 6 is a schematic plan view similar to Fig. 1 of a modified form of the invention.

In the modified form of the invention illustrated in Fig. 6, the various parts are the same as illustrated in the case of the form of the invention illustrated in Fig. 1 except as concerns the miscut-unit 16a and the automatic electric switch-mechanism as will presently be set forth. In the miscut-unit 16a, the pair of gears 123 and 124 are adapted to give the shafts 48 and 51 a one-to-one speed ratio so as to produce a cut at each rotation of the shaft 48. The pair of gears 125 and 126 are adapted to give the shafts 48 and 51 a speed ratio of two-to-three to thus accomplish one miscut in each two revolutions of the shaft 48, and the pair of clutch-gears 127 and 128 are adapted to give the shafts 48 and 51 a speed ratio of three-to-four so as to accomplish two miscuts in each three revolutions of the shaft 48. When still longer lengths of cut than can be accomplished by means of the miscut-unit 16a are desired, then with the parts of the miscut-unit 16a in the positions they are shown in Fig. 6, the clutch 68 is brought into action to clutch and unclutch the single lugs 69 and 70 to accomplish no-cutting in a manner similar to that which has been previously described in connection with the form of the invention illustrated in Fig. 1.

Thus, with the gears 91a, 94 and 95 in driving relation as shown in Fig. 6, and with the switch-arm 113a of the selector-switch 114a moved into engagement with the contact 115a, the switch 110a activated by the switch-cam 88a which latter with the shaft 90a rotates at one-fourth the speed of each of the shafts 48 and 51, will accomplish three no-cuts out of every four times that the upper cutter 59 arrives at cutting position, to thus cut a longer length of stock than can be cut by means of the miscut-unit 16a only. And by shifting the shifter-gears 94 and 95 into engagement with the gear 129, which is one and three-fourths the diameter of the gear 91a, and shifting the switch-arm 113a into engagement with the contact 130 to activate the cam 131 and the switch 132, six no-cuts out of each seven rotations of the shaft 48 will be accomplished. The construction of Fig. 6 will cut any length from thirty to four hundred and twenty inches.

Inasmuch as the gears 123 and 124 which are employed in connection with accomplishing no-cutting, have a one-to-one speed ratio, it is possible to cut any desired length of cut from thirty inches up without employing any miscut-gears such as 125, 126, 127 and 128, if enough switch-cams and associated parts are employed to accomplish no-cuts to take the place of the corresponding miscuts that would ordinarily be accomplished by the miscut-gears. Such a modified construction of Fig. 6 has been illustrated in Fig. 7 with the complete omission of all miscut-gears, merely having the pair of gears 123 and 124 having a one-to-one speed ratio. Inasmuch as the gear 124 is freely rotatable on the shaft 51, since the splined clutch-gear 128 has been eliminated, the clutch 68 is employed to accomplish all cutting. Thus, when the gears 123 and 124 are to be employed to accomplish a cut at every rotation of the shaft 48, the switch-arm 113b of the selector-switch 114b is moved into engagement with the contact 133 which closes the circuit to the solenoid 82 without having to pass through any of the cam-operated switches, to thus hold the clutch 68 to the right in clutching position to thus connect the gear 124 in driving engagement with the shaft 51 to continuously accomplish a cut at every revolution of the shaft 48.

Figure 7:
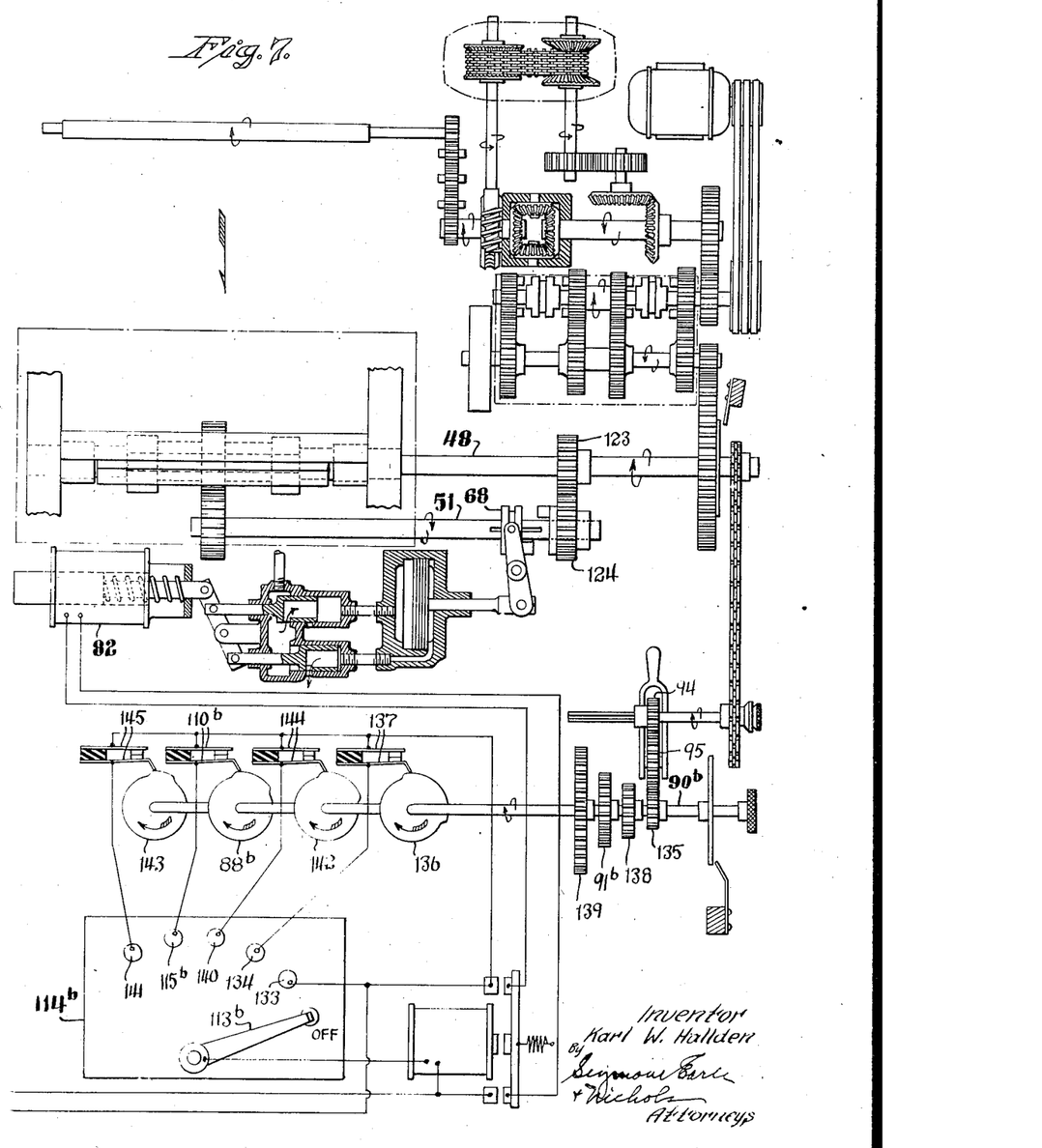
Fig. 7 is a schematic plan view similar to Fig. 6 of still another modified form of the invention.

If it is desired to accomplish one no-cut at each alternate revolution of shaft 48, this is accomplished by shifting the switch-arm 113b into engagement with the contact 134 and having the shifter-gears 94 and 95 in driving engagement with the gear 135 on the shaft 90b as shown, whereupon the cam 136 is driven at one-half the speed of each of the shafts 48 and 51, and by closing the circuit through switch 137 holds the clutch 68 out of clutching engagement with the gear 124 during at least that part of each alternate revolution of the shafts 48 and 51 when the cutter 59 arrives at cutting position, to accomplish one no-cut out of each two revolutions of the shafts 48 and 51.

And similarly, by shifting the shifter-gears 94 and 95 into engagement with one or another of the gears 138, 91b, 139, and shifting the switch-arm 113b into engagement with a corresponding one of the contacts 140, 115b, 141 to activate a corresponding one of the cams 142, 88b, 143 and a corresponding one of the switches 144, 110b, 145, two or three or four or six no-cuts can be accomplished out of every three or four or five or seven rotations, respectively, of the shaft 48. And, by providing additional gears, switch-cams and related parts, any desired number of no-cuts could be accomplished. The construction of Fig. 7 will cut any length from thirty to four hundred and twenty inches.

Figure 8:
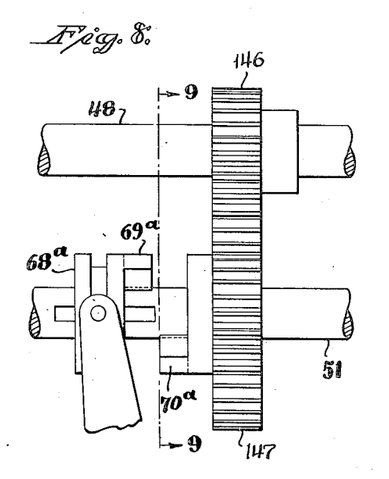
Fig. 8 is a fragmental plan view of still another modified form of the invention.
Figure 9:
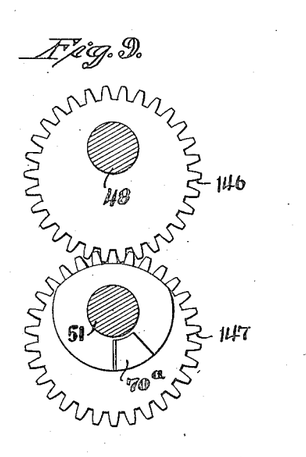
Fig. 9 is a sectional view on line 9—9 of Fig. 8.

In the form of the invention illustrated in Figs. 8 and 9, the gears 146 and 147 are a pair of eccentric gears having an average speed ratio of one-to-one, which could be substituted in place of the gears 123 and 124 in the constructions illustrated in Figs. 6 and 7.

The rotational position shown in Figs. 8 and 9 of the gears 146 and 147, as concerns the position of cut, corresponds to the rotational position of the gears 123 and 124 in Figs. 6 and 7, but inasmuch as the teeth on the upper portion of the gear 147 in Figs. 8 and 9 make it inconvenient to have the lug 70a in a corresponding position to the lug 70 on the gear 124 in Figs. 6 and 7, the lug 70a is shown at 180° displacement therefrom, at the bottom, and correspondingly, the lug 69a of the clutch 68a is shown at the top, or 180° displaced from its position in Figs. 6 and 7. The shifting of the positions of the lugs 69a and 70a through 180° has no effect upon the functioning of the parts of the machine and therefore can be ignored. Although the eccentric gears 146 and 147 have an average speed ratio of one-to-one, the actual speed ratio between the gears at different times shifts back and forth from one-to-two to two-to-one. And, by having the eccentric gears arranged as shown in Figs. 8 and 9, the lugs 69a and 70a are brought into clutching engagement when the gear 147 is moving at its slowest speed, in other words when the ratio of speeds between the shafts 48 and 51 is one-to-two at the time of engagement of lugs 69a and 70a, thus producing minimum shock from engagement of the lugs 69a and 70a. And when the gears 146 and 147 have rotated through 180° to their position as shown in Figs. 8 and 9, the gear 147 will then be moving at twice the speed of the gear 146, and since this is the position at which cutting occurs, it means that the lower cutter 62 moves to and from cutting position at relatively high speed, which is an advantage.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A flying cutting device comprising: cutter-means including two complemental cutters, and two cutter drive-shafts, one for driving each cutter; feed-means for feeding stock to be cut, to said cutters; adjustable first gearing-means adapted to interconnect said feed-means and one of said cutter drive-shafts, and adapted to be adjusted to vary the relative speeds of said feed-means and said one cutter drive-shaft; second gearing-means including clutch-means, adapted to interconnect said two cutter drive-shafts and adapted to cause said one cutter drive-shaft to drive the other cutter drive-shaft so that said cutters move to cutting position to cut stock being fed; and pre-settable clutch-actuating means adapted to automatically actuate said clutch-means to periodically unclutch it from driving relation with one of said cutter drive-shafts to cause one cutter to be non-driven and out of cutting position when the other cutter moves to cutting position, to cause a no-cut, and adapted to automatically actuate said clutch-means back to clutched position periodically to cause said one cutter to move to cutting position when the other cutter moves to cutting position, to again cut stock being fed.

2. A flying cutting device comprising: cutter-means including two complemental cutters, and two cutter drive-shafts, one for driving each cutter; feed-means for feeding stock to be cut, to said cutters; adjustable first gearing-means adapted to interconnect said feed-means and one of said cutter drive-shafts, and adapted to be adjusted to vary the relative speeds of said feed-means and said one cutter drive-shaft; second gearing-means including clutch-means, adapted to interconnect said two cutter drive-shafts and adapted to cause said one cutter drive-shaft to drive the other cutter drive-shaft so that said cutters move to cutting position to cut stock being fed, the speeds of the cycles of movement of said cutters having a one-to-one speed ratio when said clutch-means is in clutched position; and pre-settable clutch-actuating means adapted to automatically actuate said clutch-means to periodically unclutch it from driving relation with one of said cutter drive-shafts to cause on cutter to be non-driven and out of cutting position when the other cutter moves to cutting position, to cause a no-cut, and adapted to automatically actuate said clutch-means back to clutched position periodically to cause said one cutter to move to cutting position when the other cutter moves to cutting position, to again cut stock being fed.

3. A flying cutting device comprising: cutter-means including two complemental cutters, and two cutter drive-shafts, one for driving each cutter; feed-means for feeding stock to be cut, to said cutters; adjustable first gearing-means adapted to interconnect said feed-means and one of said cutter drive-shafts, and adapted to be adjusted to vary the relative speeds of said feed-means and said one cutter drive-shaft; second gearing-means including a gear and clutch-means clutchable to and unclutchable from said gear, adapted to interconnect said two cutter drive-shafts and adapted to cause said one cutter drive-shaft to drive the other cutter drive-shaft so that said cutters move to cutting position to cut stock being fed, the speed of rotation of said gear in at least part of its rotation being substantially slower than the speed of rotation of said one cutter drive-shaft; and pre-settable clutch-actuating means adapted to automatically actuate said clutch-means to periodically unclutch it from driving relation with said gear to cause one cutter to be non-driven and out of cutting position when the other cutter moves to cutting position, to cause a no-cut, and adapted to automatically actuate said clutch-means back to clutched position periodically at a time when said gear is rotating substantially slower than said one cutter drive-shaft to cause said one cutter to move to cutting position when the other cutter moves to cutting position, to again cut stock being fed.

4. A flying cutting device comprising: cutter-means including two complemental cutters, and two cutter drive-shafts, one for driving each cutter; feed-means for feeding stock to be cut, to said cutters; adjustable first gearing-means adapted to interconnect said feed-means and one of said cutter drive-shafts, and adapted to be adjusted to vary the relative speeds of said feed-means and said one cutter drive-shaft; second gearing-means including an eccentric-gear having a variable speed of rotation and clutch-means clutchable to and unclutchable from said eccentric-gear, adapted to interconnect said two cutter drive-shafts and adapted to cause said one cutter drive-shaft to drive the other cutter drive-shaft so that said cutters move to cutting position to cut stock being fed; and pre-settable clutch-actuating means adapted to automatically actuate said clutch-means to periodically unclutch it from driving relation with said eccentric-gear to cause one cutter to be non-driven and out of cutting position when the other cutter moves to cutting position, to cause a no-cut, and adapted to automatically actuate said clutch-means back to clutched position periodically at a time when said eccentric-gear is rotating relatively slowly to cause said one cutter to move to cutting position when the other cutter moves to cutting position, to again cut stock being fed.

5. A flying cutting device comprising: cutter-means including two complemental cutters, and two cutter drive-shafts, one for driving each cutter; feed-means for feeding stock to be cut, to said cutters; adjustable first gearing-means adapted to interconnect said feed-means and one of said cutter drive-shafts, and adapted to be adjusted to vary the relative speeds of said feed-means and said one cutter drive-shaft; second gearing-means including first clutch-means, adapted to interconnect said two cutter drive-shafts and adapted to cause said one cutter drive-shaft to drive the other cutter drive-shaft so that said cutters move to cutting position to cut stock being fed; pre-settable clutch-actuating means adapted to automatically actuate said first clutch-means to periodically unclutch it from driving relation with one of said cutter drive-shafts to cause one cutter to be non-driven and out of cutting position when the other cutter moves to cutting position, to cause a no-cut, and adapted to automatically actuate said first clutch-means back to clutched position periodically to cause said one cutter to move to cutting position when the other cutter moves to cutting position, to again cut stock being fed; and third gearing-means including second clutch-means, adapted to interconnect said two cutter drive-shafts when said first clutch-means is unclutched and adapted to cause said one cutter drive-shaft to drive the other cutter drive-shaft at different speed from that at which it is driven by said second gearing-means, and the relative speeds of the two cutter drive-shafts when said second clutch-means is in clutched position being such as to cause the cutters to periodically move to cutting position to cut stock being fed.

6. A flying cutting device comprising: cutter-means including two complemental cutters, and two cutter drive-shafts, one for driving each cutter; feed-means for feeding stock to be cut, to said cutters; adjustable first gearing-means adapted to interconnect said feed-means and one of said cutter drive-shafts, and adapted to be adjusted to vary the relative speeds of said feed-means and said one cutter drive-shaft; second gearing-means including a gear and first clutch-means clutchable to and unclutchable from said gear, adapted to interconnect said two cutter drive-shafts and adapted to cause said one cutter drive-shaft to drive the other cutter drive-shaft, the speed of rotation of said gear and of said other cutter drive-shaft being half the speed of rotation of said one cutter drive-shaft so that said cutters cut stock being fed, only at each alternate rotation of said one cutter drive-shaft while said drive-shafts continuously rotate, to cause a miscut between each two cuts; pre-settable clutch-actuating means adapted to automatically actuate said clutch-means to periodically unclutch it from driving relation with said gear to cause one cutter to be non-driven and out of cutting position when the other cutter moves to cutting position and when said one cutter would otherwise have been in cutting position, to cause a no-cut, and adapted to automatically actuate said clutch-means back to clutched position periodically to cause said one cutter to move to cutting position when the other cutter moves to cutting position, to again cut stock being fed; and third gearing-means including second clutch-means, adapted to interconnect said two cutter drive-shafts when said first clutch-means is unclutched and adapted to cause said drive-shafts to rotate at one-to-one speed ratio so that said cutters cut stock being fed, at each rotation of said drive-shafts.

KARL W. HALLDEN.